United States Patent
Shiner et al.

(10) Patent No.: US 10,193,620 B2
(45) Date of Patent: *Jan. 29, 2019

(54) NONLINEAR SPATIALLY RESOLVED INTERFEROMETER FOR CHARACTERIZING OPTICAL PROPERTIES OF DEPLOYED TELECOMMUNICATION CABLES

(71) Applicants: Andrew D. Shiner, Ottawa (CA); Michael Andrew Reimer, Stittsville (CA); Maurice O'Sullivan, Ottawa (CA); Andrzej Borowiec, Ottawa (CA)

(72) Inventors: Andrew D. Shiner, Ottawa (CA); Michael Andrew Reimer, Stittsville (CA); Maurice O'Sullivan, Ottawa (CA); Andrzej Borowiec, Ottawa (CA)

(73) Assignee: Ciena Corporation, Hanover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,473

(22) Filed: Apr. 15, 2018

(65) Prior Publication Data

US 2018/0241468 A1    Aug. 23, 2018

Related U.S. Application Data

(63) Continuation of application No. 15/135,272, filed on Apr. 21, 2016, now Pat. No. 9,960,843.

(51) Int. Cl.
*H04B 10/077* (2013.01)
*G01M 11/00* (2006.01)
(Continued)

(52) U.S. Cl.
CPC ......... *H04B 10/0775* (2013.01); *G01M 11/31* (2013.01); *G01M 11/335* (2013.01);
(Continued)

(58) Field of Classification Search
None
See application file for complete search history.

(56) References Cited

U.S. PATENT DOCUMENTS

| | | |
|---|---|---|
| 3,697,757 A | 10/1972 | Stone |
| 6,947,129 B1 | 9/2005 | Lu et al. |

(Continued)

FOREIGN PATENT DOCUMENTS

| | | |
|---|---|---|
| EP | 1248393 | 10/2002 |
| WO | 2009039274 | 3/2009 |

OTHER PUBLICATIONS

Agarwal, "Nonlinear Fiber Optics, 4th ed.", 2007.
(Continued)

*Primary Examiner* — Li Liu
(74) *Attorney, Agent, or Firm* — Integral Intellectual Property Inc.; Miriam Paton; Amy Scouten

(57) ABSTRACT

Using pump-probe measurements on multi-span optical links may result in the determination of one or more of the following: 1) wavelength-dependent power profile and gain evolution along the optical link; 2) wavelength-dependent dispersion map; and 3) location of regions of high polarization-dependent loss (PDL) and polarization-mode dispersion (PMD). Such measurements may be a useful diagnostic for maintenance and upgrade activities on deployed cables as well as for commissioning new cables.

18 Claims, 9 Drawing Sheets

(51) Int. Cl.
*H04B 10/079* (2013.01)
*H04B 10/07* (2013.01)

(52) U.S. Cl.
CPC .......... *G01M 11/336* (2013.01); *G01M 11/39* (2013.01); *H04B 10/07* (2013.01); *H04B 10/0795* (2013.01)

(56) References Cited

U.S. PATENT DOCUMENTS

| | | | |
|---|---|---|---|
| 7,376,358 B2 | 5/2008 | Roberts et al. | |
| 8,594,499 B1 | 11/2013 | Roberts et al. | |
| 9,960,843 B2* | 5/2018 | Shiner | H04B 10/0775 |
| 2005/0058417 A1 | 3/2005 | Tadakuma et al. | |
| 2006/0192969 A1* | 8/2006 | Marks | G01J 3/4412 356/451 |
| 2007/0025638 A1* | 2/2007 | Ozcan | G01J 11/00 382/280 |
| 2007/0027689 A1* | 2/2007 | Ozcan | G01J 11/00 704/258 |
| 2009/0073432 A1* | 3/2009 | Jalali | G01J 3/10 356/301 |
| 2009/0324249 A1 | 12/2009 | Zhang | |
| 2011/0001959 A1 | 1/2011 | Hasegawa | |
| 2011/0292377 A1* | 12/2011 | Osenberg | G01D 5/268 356/73 |
| 2015/0380892 A1* | 12/2015 | Fermann | G01N 21/31 356/301 |

OTHER PUBLICATIONS

Cao, et al., "A Fast and Accurate Method to Estimate XPM Impact Under PMD", Proceedings of COIN2012, May 2012.
Damask, "Polarization Optics in Telecommunications", Springer, 2005.
Galtarossa, et al., "Spatially Resolved PMD Measurements", Journal of Lightwave Technology: vol. 22, No. 4, Apr. 2004.
Gjesteland, "Technical solution and implementation of the Svalbard fibre cable", Telektronikk, 2004.
Gruss, Extended European Search Report for EP17167511, dated Sep. 12, 2017.
Hui, et al., "Characterization of Electrostriction Nonlinearity in a Standard Single-Mode Fiber Based on Coherent Detection and Cross-Phase Modulation", Journal of Lightwave Technology, vol. 33, No. 22, Nov. 15, 2015.
Myslivets, et al., "Spatially Resolved Measurements of the Chromatic Dispersion in Fibers", Journal of Lightwave Technology, vol. 33, No. 3, Feb. 1, 2015, pp. 597-608.
Nelson, et al., "Statistics of polarization dependent loss in an installed long-haul WDM system", Optical Society of America: vol. 19, No. 7, Mar. 2011.
Ohashi, "Fiber Measurement Technique Based on OTDR", InTech, 2013.
Onaka, et al., "Measuring the Logitudinal Distribution of Four-Wave Mixing Efficiency in Dispersion-Shifted Fibers", IEEE Photonics Technology Letters: vol. 6, No. 12, Dec. 1994.
Reimer, et al., "Direct Measurement of Nonlinear WDM Crosstalk Using Coherent Optical Detection", 2012 IEEE Photonics Conference (IPC), Sep. 23-27, 2012, pp. 322-323.
Shiner, et al., Shiner et al. "Demonstration of an 8-dimensional modulation format with reduced inter-channel nonlinearities in a polarization multiplexed coherent system." Optical Society of America: vol. 22, No. 17, Aug. 2014.
Toge, et al., "Recent Research and Development of Optical Fiber Monitoring in Communication Systems", Photonic Sensors: vol. 3, No. 4, 2013.
Wahlstrand, et al., "Effect of two-beam coupling in strong-field optical pump-probe experiments", Physical Review A 87, 053801, May 2013, pp. 053801-1 to 053801-13.

* cited by examiner

NONLINEAR SPATIALLY RESOLVED INTERFEROMETER FOR CHARACTERIZING OPTICAL PROPERTIES OF DEPLOYED TELECOMMUNICATION CABLES

TECHNICAL FIELD

This document relates to the technical field of coherent optical communications and more specifically to the characterization of optical properties of deployed telecommunication cables, for example, submarine cables.

BACKGROUND

Accurate link budgeting for submarine cables requires detailed knowledge of the dispersion map and per-wavelength power out of each amplifier (power profile), which may vary from span to span along the link (gain evolution). In practice, complete dispersion and manufacturing data for deployed cables is often not available to third party terminal equipment suppliers or cable owners, and it is only possible to measure the power profile at the termination points of the link. Coherent Optical Time Domain Reflectometers (C-OTDRs) are used to measure loss along a link.

For submarine cables that incorporate High Loss Loop Back (HLLB) channels with filters that reflect a portion of the amplifier output at a specific test channel wavelength into the return path, it is possible to measure the amplifier output at that test channel wavelength using C-OTDR. Note that this is only applicable to wavelengths that are reflected into the return path and cannot be used to determine the power profile at arbitrary wavelengths.

The present state of the art for link monitoring is summarized in K. Toge and F. Ito, "Recent research and development of optical fiber monitoring in communication systems", Photonic Sensors, vol. 3, no. 4, pp. 304-313, 2013. The primary diagnostic used on submarine cables is the coherent OTDR (C-OTDR) which measures loss as a function of distance within each span. This technique is very useful for detecting fiber breaks.

The cumulative dispersion at the end of an optical link is reported by the WL3 coherent modems commercially available from Ciena Corporation headquartered in Hanover, Md., USA.

H. Onaka, K. Otsuka, M. Hideyuki and T. Chikama, "Measuring the Longitudinal Distribution of Four-Wave Mixing Efficiency in Dispersion-Shifted Fibers", *IEEE Photonics Technology Letters*, vol. 6, no. 12, p. 1454, December 1994 describes pump/probe techniques for measuring the zero dispersion wavelength as well as the nonlinear refractive index $n_2$ of an optical fiber (given the effective area of the fiber) by measuring the variation in four wave mixing (FWM) efficiency as a function of wavelength separation between continuous wave pump and probe wavelengths. FWM efficiency is maximized at the zero dispersion wavelength and the wavelength dependent periodicity of the FWM efficiency is related to the chromatic dispersion.

Pump/probe techniques for measuring the zero dispersion wavelength have been published where the spatial overlap of forward propagating probe pulses with backward propagating pump pulses at a different wavelength is observed through the production of four wave mixing products at inter modulation frequencies. This technique would be difficult to employ on submarine cables where counter propagating waves within each span are blocked at each repeater site.

M. Ohashi, "Fiber Measurement Technique Based on OTDR", "Current Developments in Optical Fiber Technology", Dr. Sulaiman Wadi Harun (Ed.), ISBN: 978-953-51-1148-1, reports using the Rayleigh scattering efficiency to extract the mode field diameter and dispersion. These techniques generally rely on averaging measurement in both directions and require precise measurement of the back scattered power which will be difficult to measure when the scattered light has to return to the transmission site through hundreds of amplifiers.

Most non-destructive polarization-dependent loss (PDL) and polarization-mode dispersion (PMD) techniques report the value accumulated over the length of the optical link. A polarization resolved OTDR (P-OTDR) which measures the polarization state of the back-scattered light is described in A. Galtarossa and L. Palmieri, "Spatially Resolved PMD Measurements", *Journal of Lightwave Technology*, vol. 22, no. 4, p. 1103, 2004. The dynamic range of P-OTDR limits its reach to several kilometers with a spatial resolution of roughly half a meter. This technique is not applicable to multi-span systems because of the difficulty detecting the polarization state of the weak back-scattered signal and disturbance of the scattered light polarization state caused by PMD in the return path. P-OTDR is not able to resolve the circularly polarized component of the birefringence vector as the effect on the forward propagating pulse is canceled when the back-scattered light propagates through the same optical path in the reverse direction.

The hinge method described in L. E. Nelson, C. Antonelli, A. Mecozzi, M. Birk, P. Magill, A. Schex, and L. Rapp, "Statistics of Polarization dependent loss in an installed long-haul WDM system", *Optics Express*, vol. 19, no. 7, p. 6790, 2011, can be used to infer the magnitude and number of PDL and PMD sections separated by hinges along an optical link. In this model, PDL activity is assumed to originate from a finite number of hinges that are distributed along the fiber, and are separated by spans with slowly varying PMD. At a given time instant the different channels experience the same PDL elements with different polarization rotations in between them. The PDL measurements at the end of the optical link for multiple wavelengths are combined into a single PDF. By fitting to the PDF it is possible to estimate the number of hinge elements and their strengths. A similar technique can be used to identify PMD hinges.

A simulation technique based on calculating the nonlinear interaction between pump and probe pulses propagating at different wavelengths is described in Y. Cao, W. Yan, Z. Tao, L. Li, T. Hoshida and J. Rasmussen, "A fast and accurate method to estimate XPM impact under PMD", in *10th International Conference on Optical Internet (COIN)*, Yokohama, Japan, 2012. They calculate the nonlinear rotation matrix between the pump and probe pulses at the end of each span. This matrix accounts for the action of cross-phase modulation (XPM) and cross-polarization modulation (XPolM) in the span. The intent of that paper is to develop a simulation tool. The paper compares their model's predictions to those of split step Fourier simulations. There is no discussion of methods for applying the ideas of the paper to an experimental measurement.

SUMMARY

Using pump-probe measurements on multi-span optical links may result in the determination of one or more of the following: 1) wavelength-dependent power profile and gain evolution along the optical link; 2) wavelength-dependent dispersion map; and 3) location of regions of high polarization-dependent loss (PDL) and polarization-mode dispersion (PMD). Such measurements may be a useful diagnostic for maintenance and upgrade activities on deployed cables as well as for commissioning new cables.

DETAILED DESCRIPTION

This disclosure presents methods for using pump-probe measurements on multi-span optical links. Each optical link comprises multiple spans coupled by optical amplifiers.

Optical Links

Figure 1:
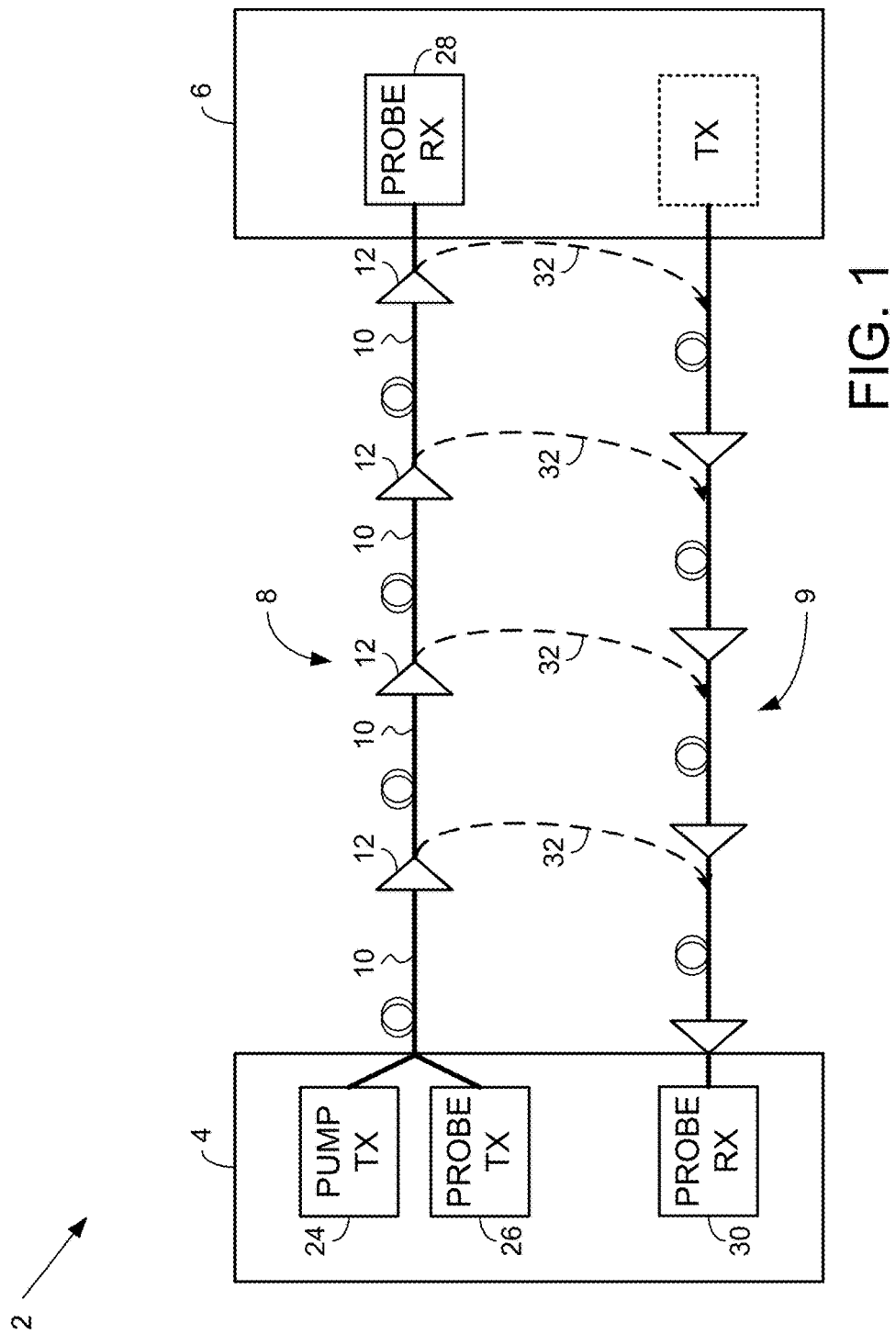
FIG. 1 illustrates an example bi-directional optical communication system.

FIG. 1 illustrates an example bi-direction optical communication system 2. A first transceiver 4 and a second transceiver 6 are connected via a telecommunications cable (not shown) carrying optical fibers. The cable may be, for example, a submarine cable or a terrestrial cable.

An optical link 8 from the first transceiver 4 to the second transceiver 6 comprises spans 10 of optical fiber coupled by optical amplifiers 12. The optical amplifiers 12 amplify the optical signal. Spans 10 are typically ~80 km in length. An optical link 9 from the second transceiver 6 to the first transceiver 4 also comprises spans of optical fiber coupled by optical amplifiers. (For simplicity, only four spans 10 and four optical amplifiers 12 are illustrated in each optical link. Typically, the number of spans 10 and the number of optical amplifiers 12 in an optical link is much larger.)

Figure 2:
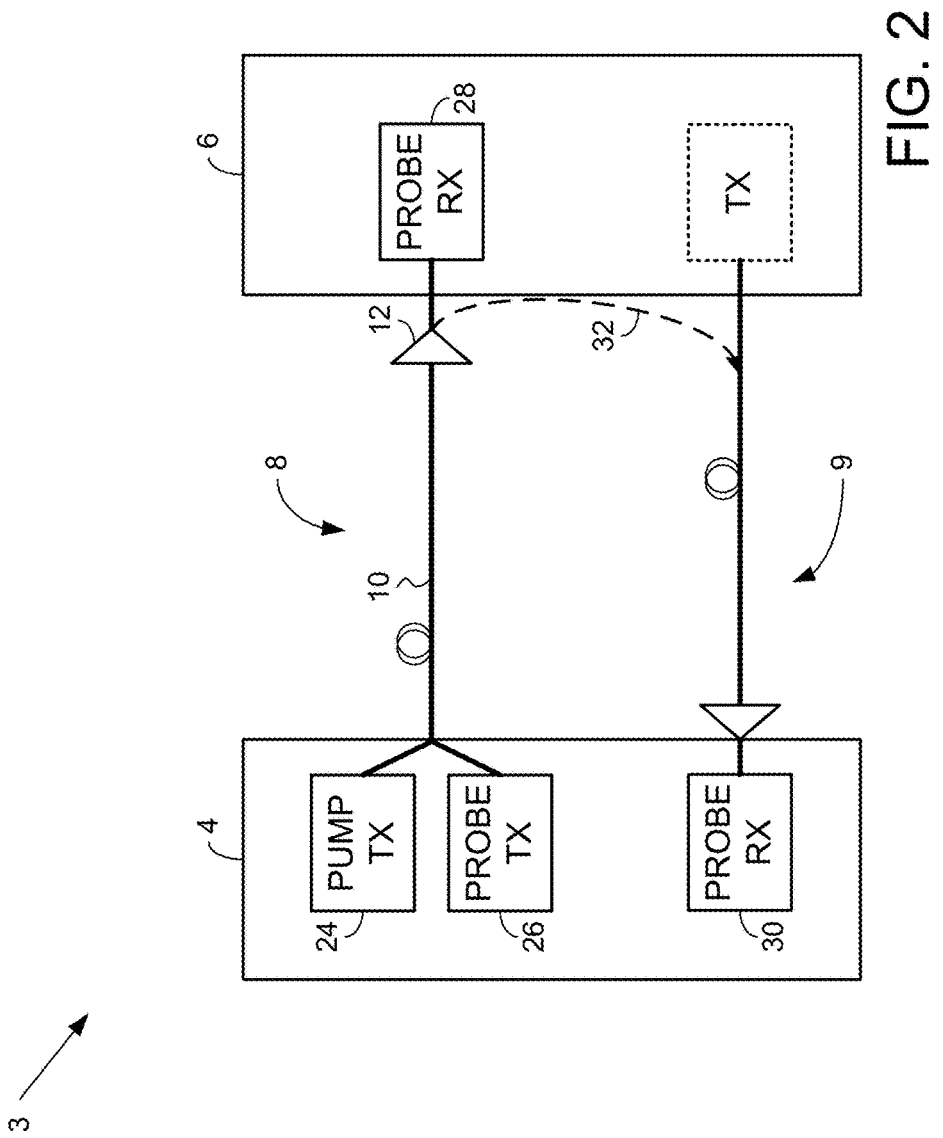
FIG. 2 illustrates another example bi-directional optical communication system.

FIG. 2 illustrates another example bi-direction optical communication system 3, which differs from the system 2 illustrated in FIG. 1 in that the optical link 8 comprises only a single span 10 of optical fiber, and the optical link 9 comprises only a single span of optical fiber.

Figure 3:
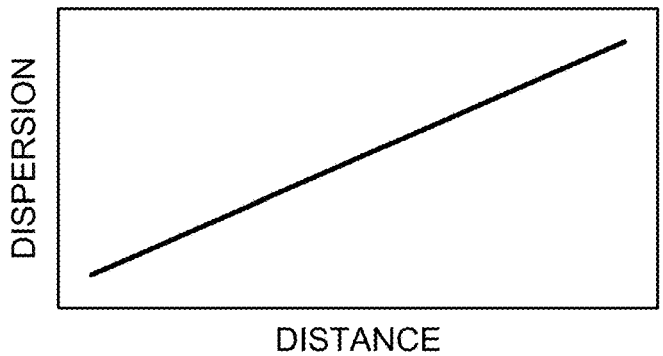
FIG. 3 and FIG. 4 illustrate example monotonic dispersion maps.
Figure 4:
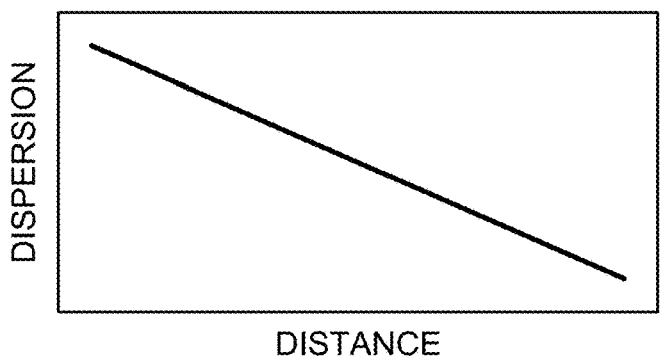

In some cases, the optical link 8 is a dispersion-uncompensated link and is characterized by a monotonic dispersion map. FIG. 3 and FIG. 4 illustrate example monotonic dispersion maps.

Figure 5:
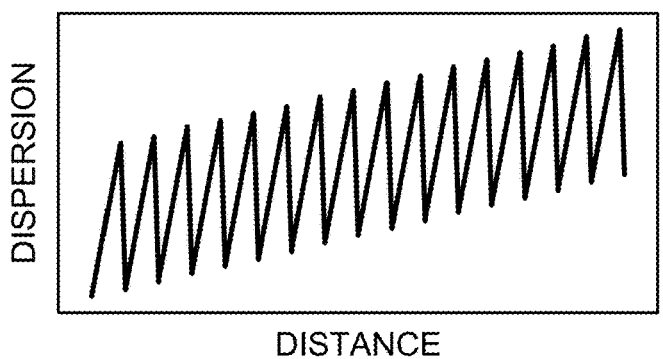
FIG. 5 and FIG. 6 illustrate example non-monotonic dispersion maps.
Figure 6:
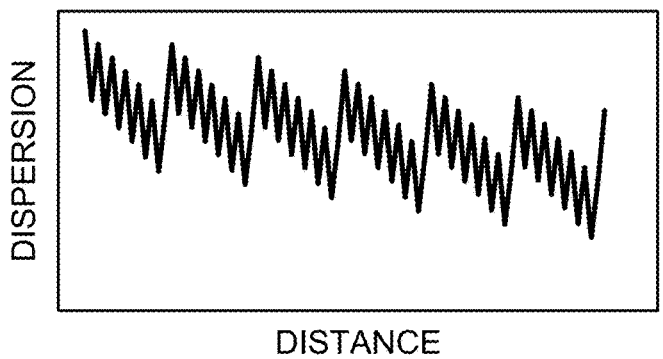

In other cases, the optical link 8 is a dispersion-compensated link and is characterized by a non-monotonic dispersion map. FIG. 5 and FIG. 6 illustrate example non-monotonic dispersion maps.

Figure 7:
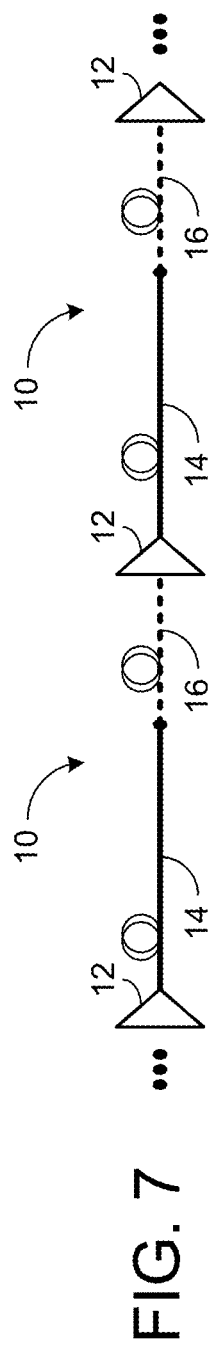
FIG. 7 illustrates an example dispersion-compensated link employing in-line dispersion compensation.

A dispersion-compensated link may employ in-line dispersion compensation. As illustrated in FIG. 7, each span 10 consists of a first segment 14 of optical fiber having a particular dispersion characteristic followed by a second segment 16 of optical fiber having an opposite dispersion characteristic. For example, the optical fiber of the first segment 14 may have a positive dispersion and the optical fiber of the second segment 16 may have a negative dispersion that compensates for 90% of the cumulative dispersion in the first segment 14. (Such an arrangement may result in the example dispersion map illustrated in FIG. 5). In another example, the optical fiber of the first segment 14 may have a negative dispersion and the optical fiber of the second segment 16 may have a positive dispersion that compensates for part of the cumulative dispersion in the first segment 14. In a further example, spans 10 comprised of multiple types of optical fiber (that is, optical fibers having different dispersion characteristics) are used to achieve the dispersion characteristics illustrated in FIG. 6.

Figure 8:
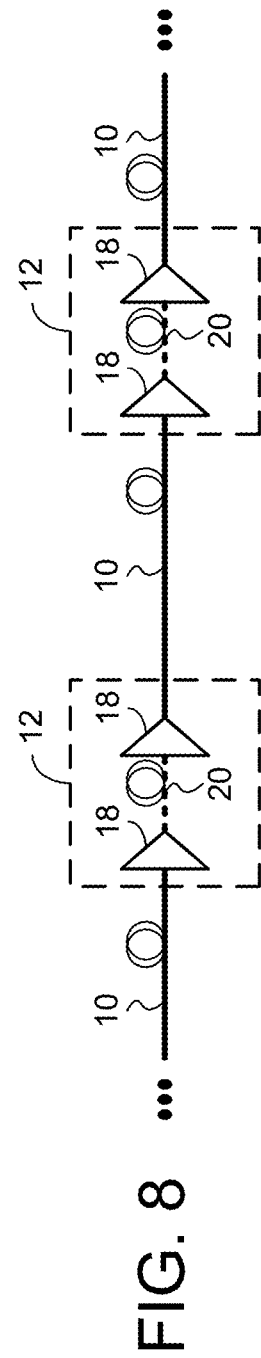
FIG. 8 illustrates an example dispersion-compensated link employing mid-stage access amplifiers.

Alternatively, a dispersion-compensated link may employ mid-stage access amplifiers. As illustrated in FIG. 8, each span 10 consists of a segment of optical fiber having a particular dispersion characteristic, and each optical amplifier 12 comprises two internal optical amplifiers 18 coupled by a segment 20 of optical fiber having an opposite dispersion characteristic.

Pump/Probe Interaction Positions

Returning to FIG. 1 and FIG. 2, pump pulses are generated by a pump transmitter 24 comprised in the first transceiver 4. Probe pulses are generated by a probe transmitter 26 at the first transceiver 6. The pump transmitter 24 and the probe transmitter 26 may be coherent transmitters, and the probe transmitter 26 may be synchronized to the pump transmitter 24.

The pump pulses and the probe pulses propagate through the optical link 8. Optical properties of the probe pulses are measured relative to a coherent reference, and physical properties of the pump pulses are calculated from the measurements on the probe pulses. The calculated physical properties of the pump pulses provide insight into physical characteristics of the optical link 8 and its one or more spans 10.

In appropriate circumstances, a probe pulse is spatially overlapped in the optical fiber with a pump pulse at one or more positions along the optical link 8. The pump pulse has a nonlinear interaction with the probe pulse at each of the one or more positions where the pump pulse and the probe pulse spatially overlap.

For cases where the optical link 8 is a dispersion-uncompensated link, the probe pulse is spatially overlapped with the pump pulse at most one position along the optical link 8. In the circumstances where the probe pulse is spatially overlapped with the pump pulse at a single position along the optical link 8, the calculated physical properties of the pump pulse are associated with that single position, referred to as "the interaction position" or "the interaction region".

For cases where the optical link 8 is a dispersion-compensated link, there are circumstances where the probe pulse is spatially overlapped with the pump pulse at multiple positions along the optical link 8. In those circumstances, the pump pulse and the probe pulse will interact over and over again, and it is difficult to determine the nonlinear interaction at a particular position along the optical link 8 from measurements made by a receiver at the end of the optical link 8. Techniques are described below for isolating the nonlinear interaction at a particular position along the optical link 8 or within a particular span 10. Using those techniques, the calculated physical properties of the pump pulse are associated with the particular position or with the particular span.

In all cases, the spatial resolution at an interaction position depends on the pulse walk-off, which is determined by the dispersion and by the wavelength separation between the pump and the probe wavelengths, and by the pulse durations. In the limit of long pulses, the pulses may overlap for the entire length of a span 10. The use of electronic pre-distortion by the pump transmitter 24 to reduce the duration of the pump pulse at an interaction position may decrease the walk-off distance and increase the spatial resolution.

In one implementation, the probe pulses that are measured have propagated through the entire optical link 8. This implementation is suitable for cases where the optical link 8 is a dispersion-uncompensated link. For example, such measurements may be performed by a probe receiver 28 at the end of the optical link 8, the probe receiver 28 comprised in the second transceiver 6. In another example, such measurements may be performed by a probe receiver 30 at the end of the optical link 9, the probe receiver 30 comprised in the first transceiver 4, where the probe pulses are redirected into the optical link 9 after having propagating through the entire optical link 8 and are then propagated over the entire optical link 9 before being measured.

In an alternate implementation, the probe pulses that are measured have propagated through a portion of the optical link 8. By comparing measurements of a probe pulse that has propagated up to a particular span 10 of the optical link 8 with measurements of a probe pulse that has propagated through the particular span 10 and not through any subsequent spans, physical characteristics of the particular span 10 can be investigated. This implementation is suitable for cases where the optical link 8 is a dispersion-compensated link and for cases where the optical link 8 is a dispersion-uncompensated link. For example, optical filters (not shown) reflect selected wavelengths into the optical link 9 via high loss loopback (HLLB) paths 32, thus creating "replicas" of the probe pulses that are measured by the probe receiver 30. The HLLBs installed at the site of each optical amplifier 12 are used to sample the probe wavelength as sampled at the output of each optical amplifier 12.

The pump transmitter 24 is configured to generate a first modulated optical carrier at a pump wavelength $\lambda 1$ carrying pump pulses. The pump wavelength $\lambda 1$ is also referred to as "the pump channel". In some implementations, the first modulated optical carrier is generated by modulating the intensity of an in-service channel at the pump wavelength $\lambda 1$ to carry the stream of pump pulses. In other implementations, the first modulated optical carrier is unrelated to an in-service channel. The probe transmitter 26 is configured to generate a second modulated optical carrier at a probe wavelength $\lambda 2$ carrying probe pulses. The probe wavelength $\lambda 2$ is also referred to as "the probe channel". The pump transmitter 24 and the probe transmitter 26 are configured to transmit the modulated optical carriers over the optical link 8.

The position or positions at which the probe pulse and the pump pulse spatially overlap depend on the initial time delay $\Delta\tau$ between the pump pulse and the probe pulse. Due to the dispersion in the optical fiber and the wavelength separation $\Delta\lambda$ between the pump wavelength $\lambda 1$ and the probe wavelength $\lambda 2$, the pump pulse and the probe pulse propagate in the optical fiber with different group velocities. The time delay between the pump pulse and the probe pulse, which is initially $\Delta\tau$ at the start of the optical link 8, changes with distance z as $z \cdot D \: \Delta\lambda$ where D is the fiber dispersion parameter. (A non-zero dispersion shifted fiber (NDSF) is a single-mode fiber designed to have a zero-dispersion wavelength near 1310 nm. The fiber dispersion parameter D of NDSF is typically ~17 ps/nm/km.) Thus the interaction position $z_{int}$, measured from the start of the optical link 8, is given by the following formula $$z_{int} = \frac{\Delta\tau}{\Delta\lambda \cdot D} \tag{1}$$

In some implementations, the pump transmitter 24 and the probe transmitter 26 are electronically synchronized, and the initial time delay $\Delta\tau$ between the pump pulse and the probe pulse will be known. In those implementations, the interaction position $z_{int}$ in the optical link 8 can be adjusted or controlled by adjusting or varying the initial time delay $\Delta\tau$ between the pump pulse and the probe pulse, or by adjusting or varying the wavelength separation $\Delta\lambda$. In other implementations, the pump transmitter 24 and the probe transmitter 26 are not electronically synchronized, and the initial time delay $\Delta\tau$ between the pump pulse and the probe pulse will be observed.

Coherent Reference—Pilot Pulses

The probe receiver 28,30 measures optical properties of the probe pulse relative to a coherent reference. The coherent reference may be one or more pilot pulses (or the coherent component thereof, if the one or more pilot pulses are not completely coherent to the probe pulses).

The probe transmitter 26 may be configured so that the second modulated optical carrier at the probe wavelength $\lambda 2$ carries pilot pulses that are arranged to not be spatially overlapped in the optical fiber with any of the pump pulses. Stated differently, the second modulated optical carrier at the probe wavelength $\lambda 2$ may carry the probe pulses and the pilot pulses. Thus the probe wavelength $\lambda 2$ may also be referred to as the probe/pilot wavelength $\lambda 2$. The pilot pulses may be designed to have substantially similar propagation characteristics to those of the probe pulses. Stated differently, the pilot pulses and the probe pulses may have nearly identical dispersion, polarization and self-phase modulation (SPM) evolution. Thus changes observed in the probe pulse relative to the pilot pulse (or to the coherent component of the pilot pulse, if the pilot pulse is not completely coherent to the probe pulse) can be attributed (after suitable averaging) to the nonlinear interaction between the pump pulse and the probe pulse. Averaging may include an averaging over realizations, over polarization and over time samples within the pulse.

For clarity, in the remainder of this document, the term "pilot pulse" refers to the component of the pilot pulse that is coherent to the probe pulse.

Figure 9:
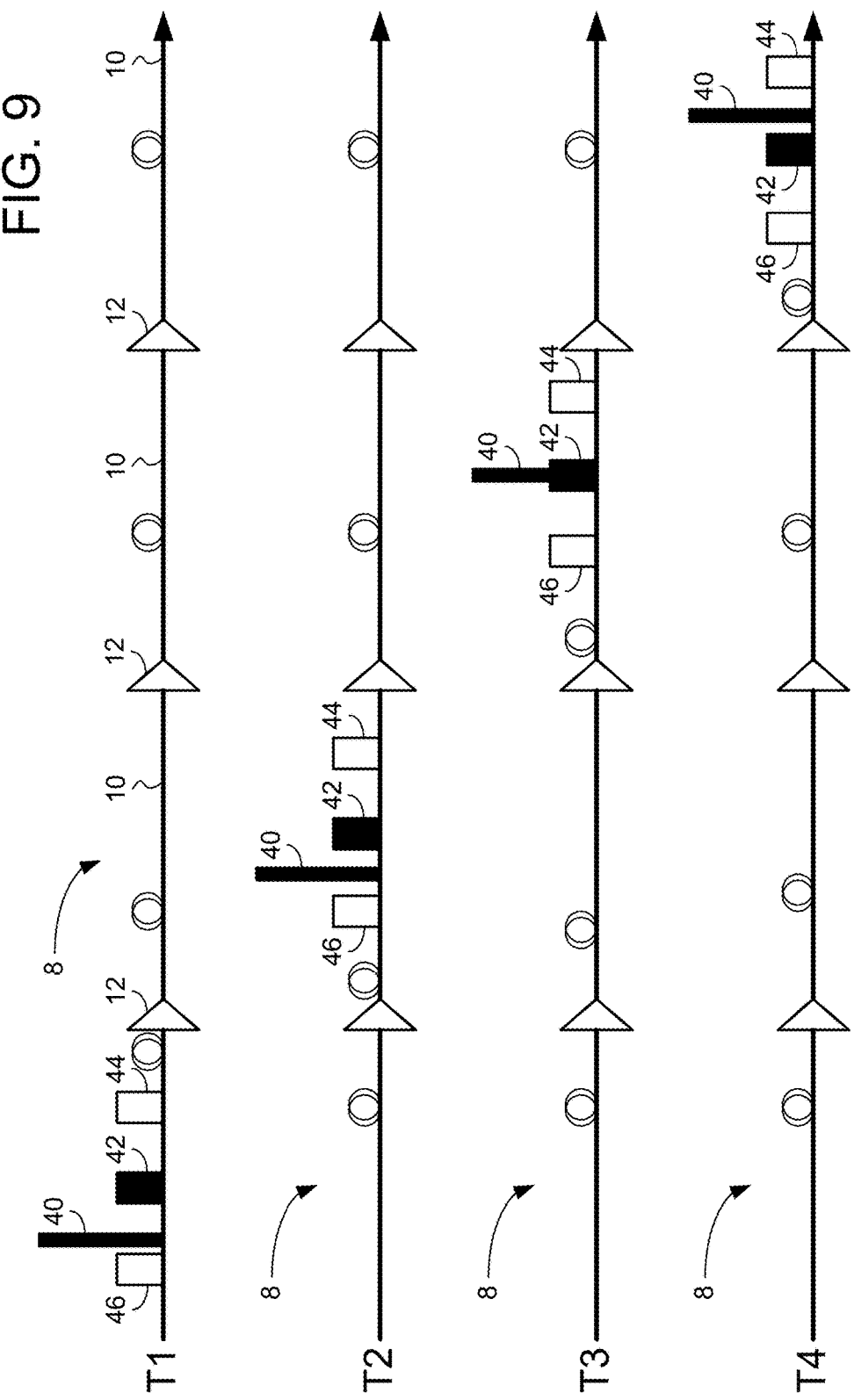
FIG. 9 illustrates propagation of an example pump pulse, an example probe pulse, and example pilot pulses along an optical link that is a dispersion-uncompensated link.

FIG. 9 illustrates propagation of an example pump pulse 40, an example probe pulse 42, an example advance pilot pulse 44, and an example following pilot pulse 46 along the optical link 8 at consecutive times T1, T2, T3 and T4. In this example, the optical link 8 is a dispersion-uncompensated link, and the probe pulse 42 is spatially overlapped with the pump pulse 40 at a single interaction position (illustrated at time T3). The single interaction position can be adjusted by controlling the initial time delay $\Delta T$ between the pump pulse 40 and the probe pulse 42, as discussed above. The advance pilot pulse 44 and the following pilot pulse 46 are located on either side of the probe pulse 42, and may be used to estimate and correct differences between transmit and receive laser sources.

Figure 10:
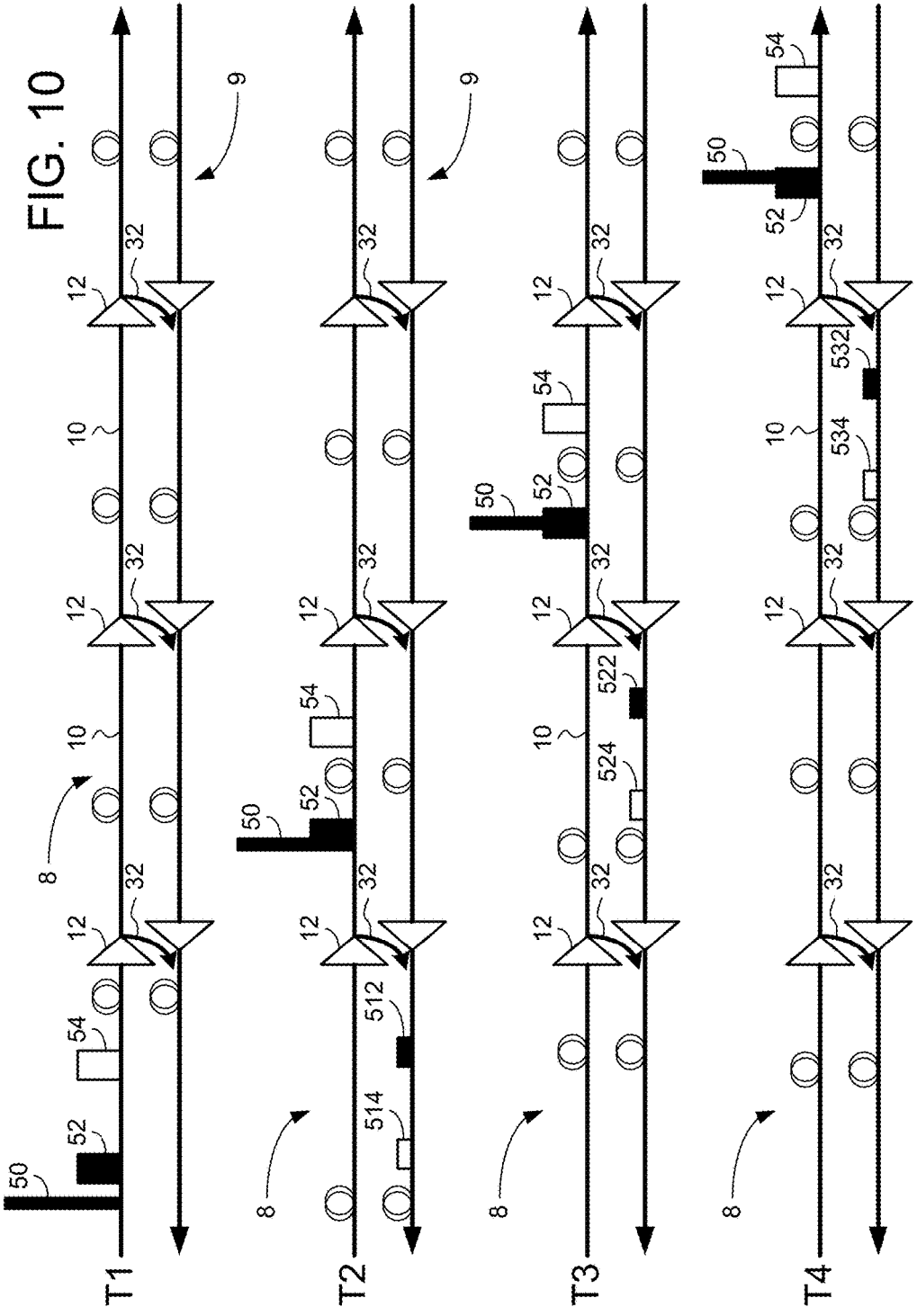
FIG. 10 illustrates propagation of an example pump pulse, an example probe pulse, and an example pilot pulse along an optical link that is a dispersion-compensated link, in a system employing high-loss loopbacks.

FIG. 10 illustrates propagation of an example pump pulse 50, an example probe pulse 52, and an example pilot pulse 54 along the optical link 8 at consecutive times T1, T2, T3 and T4. In this example, the optical link 8 is a dispersion-compensated link, and the probe pulse 52 is spatially overlapped with the pump pulse 50 at multiple interaction positions (illustrated at time T2, time T3 and time T4). The interaction positions can be adjusted by controlling the initial time delay ΔT between the pump pulse 50 and the probe pulse 52, as discussed above.

In this example, optical filters (not shown) are installed at the site of each optical amplifier 12 to reflect a portion of the probe pulse 52 and a portion of the pilot pulse 54 into the optical link 9 via the HLLB paths 32. The reflected portion of the probe pulse 50 is referred to as a "probe replica" and the reflected portion of the pilot pulse 54 is referred to as a "pilot replica". The pump wavelength λ1 of the first modulated optical carrier, which carries the pump pulses, is chosen to be outside of the bandwidth of the optical filter, so that the pump pulse 50 is not reflected into the optical link 9 and does not interact with any of the replicas on the return path. Thus the HLLBs are able to isolate the interaction between the pump pulse 50 and the probe pulse 54 within a given span 10.

In this example, a first replica 512 of the probe pulse 52 ("first probe replica 512") and a first replica 514 of the pilot pulse 54 ("first pilot replica 514") are shown at time T2, having traversed the HLLB path 32 at the first optical amplifier 12. Because the pump pulse 50 and the probe pulse 52 do not interact along the span 10 between the first transceiver 4 and the first optical amplifier 12, the first probe replica 512 and the first pilot replica 514 are nearly identical to each other.

A second replica 522 of the probe pulse 52 ("second probe replica 522") and a second replica 524 of the pilot pulse 54 ("second pilot replica 524") are shown at time T3, having traversed the HLLB path 32 at the second optical amplifier 12. Because the pump pulse 50 and the probe pulse 52 do interact along the span 10 between the first optical amplifier 12 and the second optical amplifier 12, the second probe replica 522 differs from the second pilot replica 524 in phase and polarization state. Measurements (performed by the receiver 30) of the differences are indicative of cumulative effects of nonlinear interactions between the pump pulse 50 and the probe pulse 52 along the optical link 8 up to the second optical amplifier 12.

A third replica 532 of the probe pulse 52 ("third probe replica 532") and a third replica 534 of the pilot pulse 54 ("third pilot replica 534") are shown at time T4, having traversed the HLLB path 32 at the third optical amplifier 12. Because the pump pulse 50 and the probe pulse 52 do interact along the span 10 between the second optical amplifier 12 and the third optical amplifier 12, the third probe replica 532 differs from the third pilot replica 534 in phase and polarization state. Measurements (performed by the receiver 30) of the differences are indicative of cumulative effects of nonlinear interactions between the pump pulse 50 and the probe pulse 52 along the optical link 8 up to the third optical amplifier 12. Comparing the results up to the second optical amplifier with the results up to the third optical amplifier allows extraction of properties of the span 10 between the second optical amplifier 12 and the third optical amplifier 12.

Measured Optical Properties

As mentioned above, changes observed in the probe pulse relative to the pilot pulse can be attributed (with suitable averaging) to the nonlinear interaction between the pump pulse and the probe pulse. The measured optical properties of the probe pulse may include a common mode phase of a probe pulse relative to a common mode phase of a pilot pulse. The measured optical properties of the probe pulse may include a polarization state of a probe pulse relative to a polarization state of a pilot pulse.

Pilot pulses may further be used to estimate the phase difference between a pilot pulse and a probe pulse that results from differences between the transmit and receive lasers. In one implementation, an advance pilot pulse and a following pilot pulse may be located on either side of a given probe pulse. Other configurations of the pilot pulses are possible but are not described for brevity. The common mode phase shift between the advance pilot pulse and the following pilot pulse is attributed to the differences. The differences may include residual intermodulation frequency (IF). Residual IF contributes an error to the cross-phase modulation (XPM) phase shift measured between the probe pulse and one of the pilot pulses. This error may be corrected by subtracting the phase shift measured between the two pilot pulses scaled by the ratio of the time delay between the two pilot pulses to the time delay between the chosen pilot and probe pulses, from the measured XPM phase shift. This is described in more detail below with respect to Equation 13.

Wavelength Dependence

In a pump/probe experiment, the pump pulse propagates at the pump wavelength λ1. The calculated physical properties of the pump pulse correspond to the nonlinear interaction that took place in the one or more interaction regions at the pump wavelength λ1. A property of the pump pulse may be calculated for a range of wavelengths where experiments are repeated at each of the pump wavelengths of interest, by generating pump pulses on a modulated optical carrier at a given pump wavelength λ1 and measuring the nonlinear interaction between the pump pulse and the probe pulse in the one or more interaction regions.

In one instantiation the probe wavelength λ2 is maintained at a constant value while experiments are repeated for each of the chosen pump wavelengths λ1. This configuration would be most relevant when using HLLBs to extract the probe pulse, as the probe wavelength λ2 would be confined to one of the wavelengths reflected into the return path (optical link 9) by the HLLBs.

In another instantiation when used to probe an optical link 8 characterized by a monotonic dispersion map, the wavelength separation Δλ between the first modulated optical carrier (which carries the pump pulse) and the second modulated optical carrier (which carries the probe pulse and optionally, the pilot pulse) can be held constant, and the wavelengths of the pump and probe channels can move together to determine the dependence of the measure properties on pump wavelength.

Theory of XPM and XPolM

The nonlinear interaction between modulated optical carriers propagating on a fiber optic link is well understood by those familiar with the art and is described in detail in the scientific literature. In short, the nonlinear interaction between a pump pulse propagating at the pump wavelength ⊐1 and a probe pulse propagating at the probe wavelength λ2 is dominated by the processes of cross-phase modulation (XPM) and cross-polarization modulation (XPolM).

The pump pulses, the probe pulses, and the pilot pulses may be described by complex optical field Jones vectors $|A(z,t)\rangle$, $|p(z,t)\rangle$, and $|r(z, t)\rangle$ respectively, where z represents the distance along the optical link 8 and t represents the time since initial launch into the optical link 8. These can be represented as three-dimensional Stokes vectors $\vec{A}(z,t)$ for the pump pulse, $\vec{p}(z,t)$ for the probe pulse, and $\vec{r}(z,t)$ for the pilot pulse, where the transformation from Jones space to Stokes space is calculated using the Pauli spin matrices, $\vec{\sigma}=[\sigma_1, \sigma_2, \sigma_3]$, as $\vec{A}(z,t)=\langle A(z,t)|\vec{\sigma}|A(z,t)\rangle$, $\vec{p}(z,t)=\langle p(z,t)|\vec{\sigma}|p(z,t)\rangle$, and $\vec{r}(z,t)=\langle r(z,t)|\vec{\sigma}|r(z,t)\rangle$.

As a result of nonlinear interaction with the pump pulse, the polarization state and phase of the probe pulse may be modified. The probe Jones vector following the interaction may be approximated as:

$$|p(z,t)\rangle = e^{-i\phi_{XPM}(z,t)} U_{XPolM}(z,t)|r(z,t)\rangle \quad (2)$$

where the common mode phase $\phi_{XPM}(z,t)$ and the 2×2 matrix $U_{XPolM}(z,t)$ describe the XPM and XPolM imparted on the probe channel, respectively.

A simplified model for the XPM and XPolM activity on the probe induced by the pump is given subject to the following simplifying assumptions (referred to below as "the simplifying assumptions"):

a. The power of the pump pulse is much stronger than that of the probe such that propagation with the probe pulse does not significantly modify the properties of the pump pulse.
b. The pump pulse is assumed to propagate linearly such that its propagation model only considers contributions from dispersion, attenuation and gain. The additional variations of the pump polarization state caused by XPolM interactions between the pump pulse and interfering WDM channels average to zero, provided the interfering WDM channels have no net degree of polarization. Further, any additional phase that is common to both the pilot pulses and the probe pulses does not impact the estimate of $\phi_{XPM}(z,t)$.
c. The channel separation $\Omega$ is large compared to the pump and probe/pilot channel bandwidth such that intra-channel dispersion can be neglected.
d. The channel bandwidth is small such that intra-channel polarization-mode dispersion (PMD) is negligible.
e. The efficiency for non-degenerate four wave mixing (FWM) is small compared to that of either XPM or XPolM such that FWM effects can be ignored.
f. The polarization transfer function is evaluated to leading-order in the Magnus series.

Consider the spans 10 of the optical link 8 to be indexed by the index n having integer values from 1 to N, where N is the total number of spans 10 in the optical link 8. Under the above simplifications the XPM phase shift induced in the probe pulse by the pump pulse following propagation through spans 1 to N is:

$$\phi_{XPM}(N,t) = \frac{3}{2}\int_{-\infty}^{\infty}\frac{d\omega}{2\pi}e^{+i\omega t}\sum_{n=1}^{N}\exp\left(\sum_{k=1}^{n-1}-i\omega d_k L_k\right)P_{n,mean}\cdot H_{XPM}(n,\omega) \quad (3)$$

where, $$H_{XPM}(n,\omega) = \gamma_n \frac{(1-\exp(-(\alpha_n+id_n\omega)L_n))}{(\alpha_n+id_n\omega)}\cdot\frac{\tilde{P}_1(\omega)}{P_{1,mean}} \quad (4)$$

is an effective XPM transfer function for propagation through span n, $\alpha_n$ is a fiber attenuation constant for span n, $\gamma_n$ is a nonlinear parameter for span n, $L_n$ is the length of span n, and $d_n$ is the dispersive walk-off between the pump pulse and the probe pulse in span n. In the above expressions $P_{n,mean}$ is the mean pump power at the input to span n which is defined as:

$$P_{n,mean} = \frac{1}{T}\int_0^T dt\, E\{P_n(t)\}$$

where T is a time interval characteristic of the pump pulse and $E\{P_n(t)\}$ is an expectation of the instantaneous power over any stochastic variations. The instantaneous power $P_n(t)=\langle A_n(t)|A_n(t)\rangle$ is the power of the pump pulse at the input to span n and $\tilde{P}_n(\omega)$ is the time-to-frequency Fourier transform of $P_n(t)$. The XPM transfer function (Equation 4) is shown referenced to the power spectrum in the first span. We note that any other span could be used.

The nonlinear constant $\gamma_n$ for span n depends on the effective area $A_{eff}$ of the optical fiber, the pump wavelength $\lambda_1$, and the nonlinear refractive index n2, as:

$$\gamma_n = \frac{8}{9}\cdot\frac{2\pi n_2}{\lambda_1 A_{eff}} \quad (5)$$

Through XPolM, the polarization Stokes vector of the probe pulse precesses around the Stokes vector of the pump pulse. Using the simplifying assumptions, the pump pulse is assumed to propagate linearly and is described by the position-dependent Stokes vector:

$$\tilde{A}(z,\omega) = P(z)\exp\left(-\int_0^z dz' i\omega d(z')\right)T_m(z)\cdot\frac{\tilde{A}(0,\omega)}{P(0)} \quad (6)$$

where $T_m(z)$ is the 3×3 rotation matrix that describes the rotation of the pump polarization state while the pump pulse is propagating to distance z and $P(z)$ is the average pump power at distance z. The XPolM-induced polarization rotation $U_{XPolM}(z,t)$ is given by:

$$U_{XPolM}(z,t) = \exp\left[-\frac{i}{2}\vec{r}_{XPolM}(z,t)\cdot\vec{\sigma}\right] \quad (7)$$

where $\vec{r}_{XPolM}(z,t)$ represents a time-dependent 3×1 XPolM rotation vector:

$$\vec{r}_{XPolM}(z,t) = \int_{-\infty}^{\infty}\frac{d\omega}{2\pi}e^{i\omega t}F_m(z',\omega)\frac{\tilde{A}(0,\omega)}{P(0)} \quad (8)$$

where $$F_m(z,\omega) = \int_0^z dz' \gamma(z')P(z')\exp\left(-\int_0^{z'}dz'' i\omega d_m(z'')\right)T_m(z') \quad (9)$$

is an XPolM transfer function.

If the pump pulse and the probe pulse interact over a finite distance from position $z_1$ to position $z_2$ (or if we sample the probe pulse at positions $z_1$ and $z_2$), $U_{ZPolM}$ will be related to the pump polarization state at $z_1$ modified by its evolution while propagating from $z_1$ to $z_2$. As $T_m(z)$ is not generally known we can estimate the expectation value for the pump polarization rotation matrix for propagation from $z_1$ to $z_2$ as $\langle T_m(z_2;z_1)\rangle = e^{-\eta_m(z_2-z_1)}I_3$ where $\eta_m=\Omega_m^2 D_{pmd}^2/3$ is a PMD diffusion parameter and $I_3$ is the 3×3 identity matrix. The pump/probe technique may be used to characterize the pump polarization state at $z_1$ where polarization state diffusion from $z_1$ to $z_2$ introduces a bounded measurement error.

A pump pulse that enters a given span n at position $z_1$ and interacts with the probe pulse from position $z_1$ to position $z_2$ will induce XPoM activity in the probe pulse which may be observed by sampling the probe pulse at the entrance to span n+1. Averaging over diffusion of the pump polarization state during propagation, the XPoM rotation vector is:

$$\langle \vec{r}_{XPoM}(z_2; z_1, t)\rangle = \qquad (10)$$

$$\gamma \int_{-\infty}^{\infty} \frac{(1 - \exp(-(\alpha_n + i\, d_n\omega + \eta_n)(z_2 - z_1)))}{(\alpha_n + id_n + \eta_n)} \frac{\tilde{A}(z_1, \omega)}{P(z_1)}$$

where $\tilde{A}(z_1, \omega)$ is the polarization Stokes vector of the pump pulse at position $z_1$ and $\gamma$ is taken as constant between $z_1$ and $z_2$.

For cases where the pump pulse overlaps with the probe pulse for the full propagation through a span n, the transformation matrix R that relates the probe pulse's Jones vector at the start of the span n to the probe pulse's Jones vector at the output of the span n may be approximated as:

$$R = \exp\left(-\frac{3i}{2}\gamma_n L_{eff} P_{max}\right)\exp\left(-\frac{i}{2}\gamma_n L_{eff} P_{max} \hat{s}\cdot\vec{\sigma}\right) \qquad (11)$$

where $$L_{eff} = \frac{1 - \exp(-\alpha_n L)}{\alpha_n} \qquad (12)$$

is the effective interaction distance, $\hat{s}$ is the pump polarization Stokes vector at the input to the span n, $P_{max}$ is the maximum pump power at the input to the span n, and polarization diffusion effects have been ignored.

Pump/Probe/Pilot (3P) Trials

In a pump/probe/pilot (3p) trial, pump, probe and pilot pulses are launched into the optical link 8 such that the pump pulse and the probe pulse may interact at one or more interaction position(s). For each trial, the pump and probe/pilot pulses may be prepared in different states where properties such as the relative time delay, dispersion, amplitude, duration, shape or polarization state are varied.

Repeated measurements with varying pump-probe configurations enable one or more of the following properties of a bi-directional optical communication system 2,3 to be determined: 1) wavelength-dependent power profile and gain evolution along the optical link 8; 2) wavelength-dependent dispersion map; and 3) location of regions of high polarization-dependent loss (PDL) and polarization-mode dispersion (PMD). These properties of the optical link 8 are determined as a function of optical path length which may be related to distance along the optical link 8, and it may be possible to determine these properties for different positions within the same span 10.

To measure properties of the nonlinear interaction that took place at a given interaction point, one or more 3p trials are conducted for the pump and probe/pilot prepared in one or more states labeled with subscripts k as $|A_k(z,t)\rangle$, $|p_k(z,t)\rangle$ and $|r_k(z,t)\rangle$.

MEASUREMENT EXAMPLES

Determination of Power Profile/Tilt

The power of the pump pulse in the interaction region may be inferred from the XPM phase shift induced in the probe pulse. Due to XPM, the power envelope of the pump pulse is imprinted into the phase of the probe pulse. The magnitude of the common mode phase shift imprinted in the probe pulse by the pump pulse is one measure of the strength of the nonlinear interaction between the pump pulse and the probe pulse. The magnitude of the common mode phase shift imprinted in the probe pulse by the pump pulse is measured at the receiver relative to a coherent reference, and is proportional to the power of the pump pulse at the interaction position.

Following propagation the probe/pilot wavelength λ2 is sampled at the optical amplifier at the end of span n. The probe/pilot wavelength λ2 may be sampled at the end of the optical link 8. The XPM phase shift is extracted from the detected probe pulses and pilot pulses as:

$$\phi_{XPM}(n) = \angle E\left\{\frac{1}{t_2 - t_1}\int_{t_1}^{t_2}\langle p(t)|r(t+\Delta T)\rangle dt\right\} \qquad (13)$$

where the integration is typically over a region near the peak of the pulse, $\Delta T$ is the temporal delay between probe and pilot pulses, and $E\{\ldots\}$ denotes the expectation over repeated 3p trial instances and polarization states. When a second pilot pulse is used for IF estimation where the first pilot pulse precedes the probe by $\Delta T_1$ and the second pilot follows the probe by $\Delta T_2$ the laser phase ramp is given by:

$$\phi_L(n) = \angle E\left\{\frac{1}{(t_2-t_1)(\Delta T_1 + \Delta T_2)}\int_{t_1}^{t_2}\langle r(t-\Delta T_1)|r(t+\Delta T_2)\rangle dt\right\}$$

and the corrected XPM phase is:

$$\phi_{XPM}(n) = \angle E\left\{\frac{1}{t_2-t_1}\int_{t_1}^{t_2}\langle r(t-\Delta T_1)|p(t)\rangle dt\right\} -$$

$$\phi_L(n)\Delta T_1 + \angle E\left\{\frac{1}{t_2-t_1}\int_{t_1}^{t_2}\langle p(t)|r(t+\Delta T_2)\rangle dt\right\} - \phi_L(n)\Delta T_2$$

where $E\{\ldots\}$ denotes the expectation over repeated 3p trial instances and polarization states. The XPM phase shift is related to the pump power in the interaction region(s) for example by Equation (3). The measured phase shift $\phi_{XPM}(n)$ includes the cumulative XPM phase shift from all pump/probe interactions up to the output of the optical amplifier at the end of span n.

For the case where the pump pulse and the probe pulse overlap for the full length of span n and the probe XPM phase shift is sampled at the input to span n as well as the input to span n+1 (such as in the case where HLLBs are used), the pump power in span n may be calculated using:

$$\phi_{XPM}(n+1) - \phi_{XPM}(n) = -\sqrt{3};2\gamma_n L_{eff}P_{max} \qquad (14)$$

The polarization averaging may be satisfied by repeating over a series of trials with the pump pulse prepared in appropriate polarization states, by repeating over a series of trials with the probe pulse prepared in appropriate polarization states, by repeating over a series of trials with the pump pulse and the probe pulse prepared in appropriate polarization states, by randomizing the pump polarization or the probe polarization or both at the transmitter site, or by operating under conditions of sufficient PMD such that polarization averaging occurs during propagation.

The XPM phase shift at a given position may also be measured by adjusting the initial time delay $\Delta\tau$ between the pump pulse and the probe pulse in order to position the interaction region at the chosen position, and then measuring $\phi_{XPM}(n)$ at a span n located after the interaction region. In that case the XPM phase shift is again related to the pump power in the interaction region for example through Equation (3). The mapping from phase shift to power is calculated with the transmit pulse shapes and pump/probe wavelength separation as parameters.

By adjusting or varying the pump wavelength $\lambda 1$ of the first modulated optical carrier that carries the pump pulses, the wavelength variation of the optical power (power tilt) at the overlap position(s) can be measured, and by varying the overlap position(s), the power tilt can be mapped as a function of distance z from the start of the optical link 8. Stated differently, by performing repeated transmissions of pump pulses and probe pulses with different wavelengths $\lambda 1$ for the pump pulse, and then measuring the phase of the corresponding probe pulse, the change in the power of the pump pulse at a given distance z from the start of the optical link 8 is mapped as a function of wavelength.

If the fiber type and parameters $\gamma$ and $\alpha$ are not known, common mode phase shifts can be used to determine the relative variation in power of the pump pulse as a function of wavelength. For example, a first common mode phase shift $\phi 1$ determined from calculation using $\phi_{XPM}$ (for example from Equation (3)) on measurements performed with the pump pulse carried by a modulated optical carrier at a first pump wavelength $\lambda 1$ is proportional to the power P1 of the pump pulse at the interaction position within the particular span. A second common mode phase shift $\phi 2$ determined from measurements performed with the pump pulse carried by a modulated optical carrier at a second pump wavelength $\lambda 1$ is proportional to the power P2 of the pump pulse at the interaction position within the particular span. Thus the ratio of the second common mode phase shift $\phi 2$ to the first common mode phase shift $\phi 1$ is equivalent to a ratio of the power P2 to the power P1, and provides a measure of the relative variation in power of the pump pulse at the interaction point within the particular span as a function of pump wavelength $\lambda 1$ of the first modulated optical carrier, which carries the pump pulses. Measurements of the power profile are of interest in submarine applications where the link can develop substantial power tilts.

Calculation of Dispersion Map by determining Strength of Non-Linear Interaction

As mentioned above, HLLBs may be used to sample the probe field at the output of each span. The nonlinear interaction between the pump pulse and the probe pulse within a given span is maximized when the pump pulse and the probe pulse spatially overlap within the span. The strength of the nonlinear interaction can be observed through the magnitude of the common mode phase shift imprinted in the probe pulse by the pump pulse due to XPM. By comparing the common mode phase of a probe replica reflected immediately prior to a particular span of the optical link 8 to the common mode phase of a probe replica reflected immediately after traversing the particular span, one can determine the strength of the nonlinear interaction between the pump pulse and the probe pulse in the particular span. By varying the initial time delay $\Delta\tau$ between the pump pulse and the probe pulse, one can determine the initial time delay $\Delta\tau$ that maximizes the nonlinear interaction between the pump pulse and the probe pulse within a particular span of the optical link 8. When combined with the known wavelength separation $\Delta\lambda$ between the carriers of the pump pulse and the probe pulse, the initial time delay $\Delta\tau$ that maximizes the nonlinear interaction within a particular span can be used to calculate the cumulative dispersion at each optical amplifier 12 and the dispersion map for the optical link 8.

In yet another instantiation the dispersion can be measured on an optical link without employing HLLBs by first measuring the non-linear interaction strength as a function of pump/probe initial time delay $\Delta\tau$. The locations of optical amplifier sites will be apparent in the record of the dependence of the non-linear interaction strength on the initial pump/probe time delay $\Delta\tau$ manifesting as a rapid increase in interaction strength at the position of an optical amplifier followed by an exponential decrease as the overlap position moves into a given span. The initial time delay $\Delta\tau$ combined with the pump/probe wavelength separation $\Delta\lambda$ gives the cumulative dispersion at each optical amplifier site. The distance between optical amplifier sites can be measured with a conventional OTDR which, when combined with the cumulative dispersion at each optical amplifier site, gives the dispersion in each span.

Determination of Pump Polarization State, PMD and PDL

In another instantiation the pump polarization state may be inferred from the change in probe polarization state following the nonlinear interaction with the pump. Due to XPolM, the polarization state of the probe pulse is modified by the polarized pump pulse. More specifically, the polarization state of the probe pulse will precess around an axis defined by the polarization Stokes vector of the pump pulse. Observing the polarization state of the probe pulse at the receiver (for a range of initial polarization states of the probe pulse) enables the extraction of the polarization state of the pump pulse at the interaction position.

In order to uniquely define the pump polarization state, in the reference frame of the probe pulse, trials are conducted with the probe pulse prepared in a minimum of two linearly independent polarization states. Measurements for trials with the probe pulse prepared in the different polarization states are related through the 3×3 complex transformation matrix R as:

$$R[\vec{r}_1(z, t+\Delta T), \vec{r}_2(z, t+\Delta T), \ldots] = [\vec{p}_1(z,t), \vec{p}_2(z,t), \ldots] \quad (15)$$

where $\Delta T$ is the temporal delay between probe and pilot pulses, and $\vec{p}_k(z, t) = \langle p_k(z,t) | \vec{\sigma} | p_k(z,t) \rangle$ and $\vec{r}_k(z,t) = \langle r_k(z,t) | \vec{\sigma} | r_k(z,t) \rangle$ are the Stokes space representations of the probe fields and pilot fields respectively.

The transformation matrix R which is common to the linearly independent trials uniquely determines the polarization state of the pump pulse at the interaction position. The solution for the transformation matrix R requires the polarization state of the pump pulse to be static relative to the reference frame of the probe pulse for the duration of the trials. The typical polarization temporal autocorrelation time for submarine cables is on the order of hours to days, whereas the duration of the trials is expected to be on the order of several seconds.

During the first trial, the Stokes vectors $\vec{r}_1(z, t+\Delta T)$ of the pilot pulse and $\vec{p}_1(z, t)$ of the probe pulse are measured. During the second trial, the Stokes vectors $\vec{r}_2(z, t+\Delta T)$ of the pilot pulse and $\vec{p}_2(z, t)$ of the probe pulse are measured. The measurements continue for the set of pump/probe/pilot configurations.

A matrix P is formed of the Jones vectors of the probe pulse, as $$P = [\vec{p}_1(z,t), \vec{p}_2(z,t), \ldots] \quad (16)$$

A matrix M is formed of the Jones vectors of the pilot pulse, as $$M=[\vec{r}_1(z, t+\Delta T), \vec{r}_2(z, t+\Delta T), \ldots] \quad (17)$$

The matrix PM\, which is composed of the matrix P and the Hermitian adjoint (conjugate transpose) of the matrix M, can be factored using singular value decomposition (SVD) as $$PM\backslash = U\Sigma V\backslash \quad (18)$$

where U and V are unitary matrices and $\Sigma$ is a diagonal matrix of singular values. The transformation matrix R is then given by UV\, that is:

$$R=UV\backslash \quad (19)$$

The Stokes vector describing the polarization state of the pump pulse, $\vec{v}=[v_1, v_2, v_3]^T$ at the interaction region is related to R by:

$$R - R^\dagger = 2\sin(\phi)\begin{pmatrix} 0 & -v_3 & v_2 \\ v_3 & 0 & -v_1 \\ -v_2 & v_1 & 0 \end{pmatrix} \quad (20)$$

and $$\hat{v} = \frac{\vec{v}}{|\vec{v}|} \quad (21)$$

The normalized Stokes vector p can be determined without knowledge of the normalization constant $\sin(\phi)$.

The evolution of the pump polarization state may be tracked as the pump pulse propagates through the optical link 8 by comparing the change in polarization state between successive probe replicas (relative to pilot replicas) when performing measurements with HLLBs.

Within a single span, or along a multi-span optical link characterized by a monotonic dispersion map, the evolution of the pump polarization state may be mapped by adjusting or varying the initial time delay $\Delta\tau$ between the pump pulse and the probe pulse. Stated differently, by performing repeated transmissions of pump pulses and probe pulses with different initial time delays between a pump pulse and corresponding probe pulse, and then measuring the polarization state of the corresponding probe pulse, the change in the polarization state of the pump pulse as the pump pulse propagates down the optical link 8 is mapped as a function of distance either between replicas when using HLLBs or from the start of the optical link 8 when measuring a span 10 characterized by a monotonic dispersion map.

The change in the polarization state of the pump pulse can be measured as a function of distance (interaction point) and as a function of wavelength separation between the pump pulse and the probe pulse. These measurements characterize the polarization-mode dispersion (PMD) as a function of distance along the optical link 8.

Determination of the pump polarization state may be repeated for a sequence of pump pulses prepared in non-collinear polarization states. By performing repeated transmissions of pump pulses and probe pulses with different initial polarization states for the pump pulse, it is possible to identify the polarization state of the pump pulse (within a given interaction region) that maximizes the common mode phase of the probe pulse and the polarization state of the pump pulse (within the same interaction region) that minimizes the common mode phase of the probe pulse. Comparing the common mode phase between the best case and the worst case of polarization orientations gives a measure of the magnitude and orientation of the polarization-dependent loss (PDL). Thus the location of regions of high polarization-dependent loss (PDL) can be determined.

Transmitter Design, Receiver Design and Dsp

Figure 11:
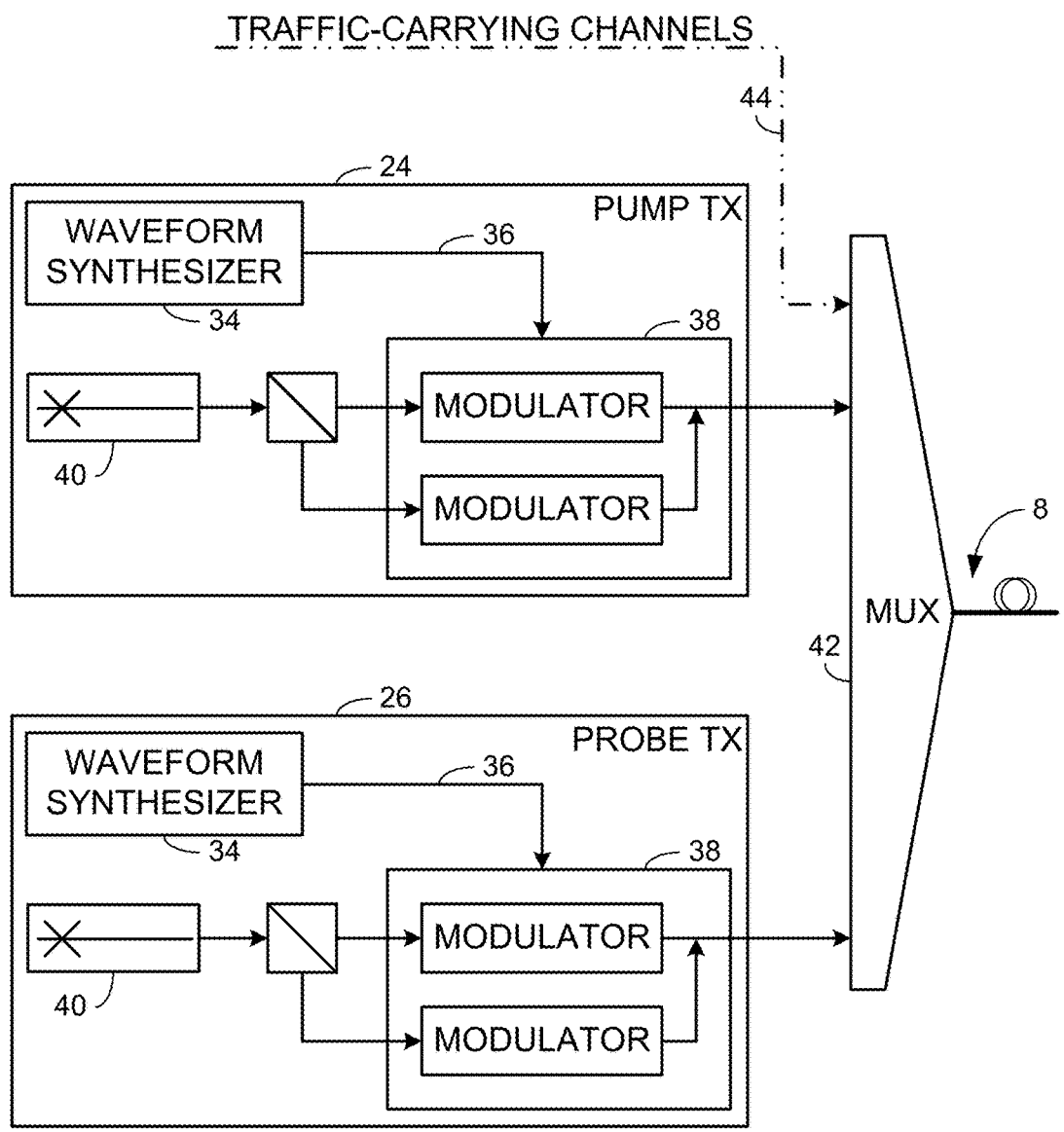
FIG. 11 illustrates an example pump transmitter and an example probe transmitter in a transceiver.

FIG. 11 illustrates an example of the pump transmitter 24 and an example of the probe transmitter 26 in the first transceiver 4. The pump transmitter 24 and the probe transmitter 26 both generally comprise an electronic waveform synthesizer 34 to generate a waveform signal 36. The waveform signal 36 is then supplied to a modulator 38 for modulating respective dimensions of a continuous wave (CW) optical carrier in accordance with the waveform signal 36. In the case of the pump transmitter 24, the CW optical carrier is at the pump wavelength $\lambda 1$. In the case of the probe transmitter 26, the CW optical carrier is at the probe wavelength $\lambda 2$. The CW optical carrier is typically generated by a laser 40 in a manner known in the art, and the modulator 38 may be implemented using any of a variety of known modulator devices, such as phase modulators, variable optical attenuators, Mach-Zehnder interferometers, etc. A multiplexer 42 combines the modulated optical signal appearing at the output of the modulator 38 of the pump transmitter 24 with the modulated optical signal appearing at the output of the modulator 38 of the probe transmitter 26, and optionally, with other traffic-carrying channels 44, and the combined signals are transmitted through the optical link 8.

Figure 12:
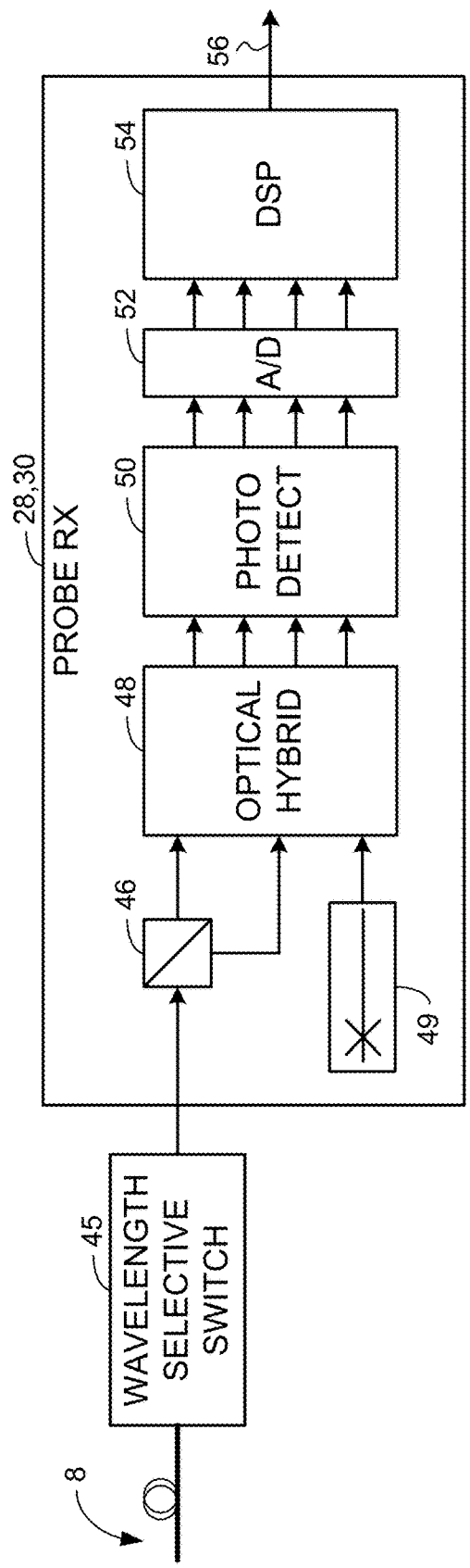
FIG. 12 illustrates an example of a probe receiver in a transceiver.

FIG. 12 illustrates an example of the probe receiver 28,30. A wavelength selective switch 45 passes the probe wavelength $\lambda 2$ to the probe receiver 28,30. The probe/pilot channel is directed into the probe receiver 28,30 where the electrical field (phase and amplitude) of the received field in the x and y polarization states (isolated by a polarization beam splitter 46) is measured by an optical hybrid 48 with respect to the field of a local oscillator 49 and converted by photodetectors 50 to electrical signals. The signals are then digitized with analog to digital converters 52 and stored on a computer (for example, a digital signal processor 54) for processing.

An example of the processing of the resulting signals is as follows:

a. Load captured waveform
b. Remove chromatic dispersion (in some cases)
c. Remove intermodulation frequency between known transmit waveform and received waveform by finding the time delay and intermodulation frequency that maximizes the cross correlation between the transmit and received waveforms.
d. Locate each 3p trial within the received record through cross-correlation with the transmit waveform.
e. From each 3p trial extract the pump and probe fields $|p(t)\rangle$ and $|r(t)\rangle$, respectively.

Figure 13:
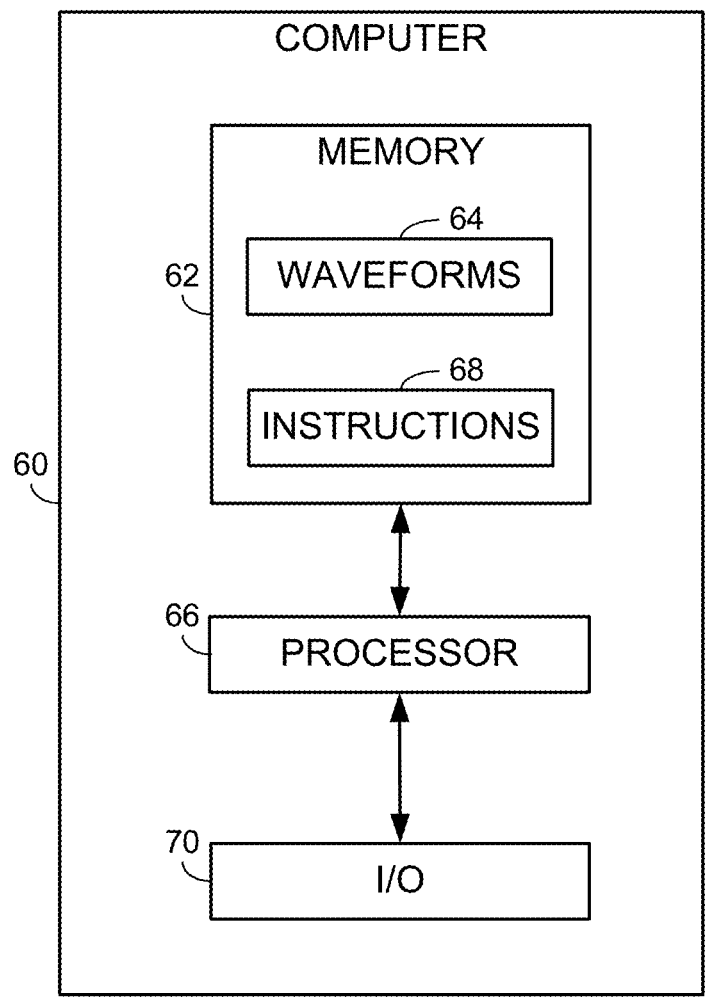
FIG. 13 is a simplified block-diagram illustration of a general-purpose computer.

In some implementations, the computer that processes the stored waveforms is a general purpose computer specially configured to process the stored waveforms as described above. FIG. 13 is a simplified block-diagram illustration of a general-purpose computer device 60. A physical, non-transitory computer-readable medium, such as a memory 62, stores computer-readable instructions 64, which when executed by a processor 66, result in the processing of stored waveforms 68 as discussed above. The stored waveforms 68 are illustrated as stored in the memory 62, but may be stored in a different memory (not shown) of the general-purpose computer device 60. Various input/output components 70 are coupled to the processor 66 to enable receipt of the waveforms 68, control of various processing parameters, and output of the results of processing the waveforms 68.

Pulse Sequence and Shape Design

As described in the section entitled PUMP/PROBE/PILOT (3P) TRIALS, a measurement sequence consists of pump pulses, probe pulses, and pilot pulses prepared in one or more states where properties such as the relative time delay, dispersion, amplitude, duration or polarization state are varied.

Repeated measurements with varying pump-probe-pilot configurations enable one or more of the following properties of a bi-directional optical communication system 2,3 to be determined: 1) wavelength-dependent power profile and gain evolution along the optical link 8; 2) wavelength-dependent dispersion map; and 3) location of regions of high polarization-dependent loss (PDL) and polarization-mode dispersion (PMD).

Traditional coherent optical time domain reflectometry (C-OTDR) is based on monitoring the back scattered light as the probe pulse propagates through the optical fiber. The measurement interval is given by the round trip time through the optical link, and the receiver must continuously acquire during this time. In contrast, the techniques discussed in this disclosure enable multiple pulses to be launched into the optical link 8 at the same time, provided that no pump/probe/pilot member from one trial spatially overlaps with any pump/probe/pilot member from any other trial at any position along the link between locations where the probe/pilot pulses are sampled and compared.

The minimum delay between pulses is roughly given by Equation (1), where the cumulative dispersion at the end of the optical link 8 and the wavelength separation $\Delta\lambda$ are used to estimate the maximum walk-off. For the example of a 10,000 km of NDSF link (having a fiber dispersion parameter D of approximately 17 ps/nm/km) with a 2 nm wavelength separation between the pump pulses and the probe pulses, the minimum delay between measurements is 0.3 µs.

For measurements employing HLLBs probe/pilot pulse replicas will be reflected back from each optical amplifier site and the pulse sequence must ensure that replicas do not overlap on the return path. For example, for 10,000 km of NDSF (having a fiber dispersion parameter D of approximately 17 ps/nm/km) with a 2 nm wavelength separation between the pump pulses and the probe pulses, replicas of a probe pulse will be returned every 0.8 ms, corresponding to the round trip time for a span 10 of length 80 km. Additional measurements can be inserted between the replicas provided that the pulses are separated by at least 0.3 µs. Within a 0.8 ms burst, 2667 pulse sequences (consisting of the pump pulse, the probe pulse and the pilot pulse) can be launched without risk of collision. Pulses will be detected at the receiver in 0.3 µs intervals until the burst has completed the 100 ms (2×10,000 km) round trip through the optical link 8, at which time the next burst of 2667 pulses can be sent. With this sequence, a given span 10 is probed at 26.6 kHz and the 125 spans 10 in the 10,000 km optical link 8 are probed simultaneously for a total measurement acquisition rate of 3.3 MHz.

In a typical application the pulse sequence may be chosen to measure the properties of a channel that would be experienced by a modulated waveform carrying traffic on that channel. As such the average power and polarization state of the pump waveform may be chosen to match the properties of the traffic-carrying waveform. The pump pulse, probe pulse and pilot pulses are surrounded by guard regions that insure that the probe pulse spatially overlaps only with the pump pulse and that the probe/pilot pulses do not spatially overlap with any other modulated part of the pump waveform at any position along the optical link. Outside of the guard region the pump waveform and the probe/pilot waveforms are typically filled with a padding region consisting of polarization multiplexed phased modulated data symbols such as X-constellation symbols. See, for example, A. D. Shiner et al., "Demonstration of an 8-dimensional modulation format with reduced inter-channel nonlinearities in a polarization multiplexed coherent system", Opt. Express 22 (17), p.20366 (2014). The padding region helps to present the amplifiers with a polarization diverse waveform and reduces the peak to root mean square (RMS) power ratio of the waveform. In most cases the duration of the pump waveform or the probe/pilot waveform including the guard region is on the order of 100 nanoseconds to one microsecond. This timescale is much faster than the lifetime of the excited state of $Er^+$ used in optical amplifiers and much faster than the response time of any control loops which may be running on the optical amplifiers 12. Given the disparate timescales, the amplifier response will be governed by the average power and polarization of the pump waveform and the probe/pilot waveforms, and measurements for properties such as power and PDL will not be perturbed by the dynamic response of the channel.

The optimal choice of pulse shape and duration depends on the wavelength separation $\Delta\lambda$ between the pump pulses and the probe pulses, the pulse bandwidth and the dispersion. These properties determine the XPM and XPolM bandwidths which moderate the strength of the nonlinear interaction between the pump channel and the probe channel. In effect, the magnitude of the phase shift, and with it the sensitivity of the measurement, is inversely proportional to the spatial resolution. Within reason, the durations of the pump pulse and the probe pulse can be chosen as convenient to generate, and then the separation between the channels can be selected for the best trade-off between spatial resolution and sensitivity (averaging time).

Numerous modifications and variations of the present invention are possible in light of the above teachings. It is therefore to be understood that within the scope of the appended claims, the invention may be practised otherwise than as specifically described herein.

The foregoing discussion describes transmitting for each pump pulse only a single probe pulse (and, possibly, one or more pilot pulses). In other implementations, multiple probe pulses may be used, each with a different initial time delay $\Delta\tau$ relative to the pump pulse. For example, multiple probe pulses may be transmitted in the time between pilot pulses. If 20 probe pulses are squeezed in between two pilot pulses, then for each 3p trial, the nonlinear interaction is measured at 20 different overlap interaction positions.

The common mode phase shift and or change in polarization state induced in a probe pulse through interaction with a pump pulse is measured with respect to a pilot pulse. In the ideal circumstances described above there is no interaction between the pump pulse and the pilot pulse during propagation through the link. This ideal arrangement that the pilot pulse does not spatially overlap with any of the pump pulses may be achieved by appropriate selection of the time delay between the pilot pulse and the pump pulse and appropriate pulse shaping. In practice, however, viable common mode phase and polarization state measurements remain possible in cases where there is some interaction between the pump and pilot pulses provided that the error introduced through such an interaction is small compared to the quantity being measured or for cases where the error is deterministic and can be corrected. For example, measurements remain viable for cases where the error in measured common mode phase shift is <50% or the error in measured polarization state is <90 degrees on the Poincaré sphere. Accordingly, in the claims, the phrase "pilot pulses arranged to not be spatially overlapped in the optical fiber with any of the pump pulses" is intended to include such cases where there is some interaction between the pilot pulses and the pump pulses that introduces a small error or a deterministic-yet-correctable error.

What is claimed is:

1. A method for measuring physical properties of optical signals as a function of wavelength and as a function of location in an optical link, the method comprising:
   generating a first modulated optical carrier at a first wavelength, the first modulated optical carrier carrying pump pulses;
   generating a second modulated optical carrier at a second wavelength that differs from the first wavelength, the second modulated optical carrier carrying pilot pulses and carrying probe pulses;
   transmitting the first modulated optical carrier and the second modulated optical carrier on an optical fiber over the optical link, the optical link comprising multiple spans connected by one or more optical amplifiers, such that a probe pulse of the probe pulses is spatially overlapped in the optical fiber with a pump pulse of the pump pulses within at least one interaction region in the optical link;
   performing a measurement on the probe pulse beyond an end of the optical fiber to measure optical properties of the probe pulse relative to a coherent reference, wherein the coherent reference includes a component of at least one of the pilot pulses, the component being coherent to the probe pulse; and
   calculating physical properties of the pump pulse from the measurement on the probe pulse,
   wherein the pilot pulses are arranged to be not spatially overlapped in the optical fiber with any of the pump pulses, or the pilot pulses are arranged so that any interaction between the pilot pulses and any of the pump pulses introduces a negligible error or a deterministic-yet-correctable error in measurement of the optical properties.

2. The method as recited in claim 1, wherein the coherent reference includes a coherent component of an advance pilot pulse of the pilot pulses in advance of the probe pulse and a coherent component of a following pilot pulse of the pilot pulses following the probe pulse, and wherein performing the measurement on the probe pulse beyond the end of the optical fiber to measure optical properties of the probe pulse relative to the coherent reference comprises using the advance pilot pulse and the following pilot pulse to estimate and correct differences between transmit and receive laser sources.

3. The method as recited in claim 1, further comprising adjusting a time delay between the pump pulse and the probe pulse.

4. The method as recited in claim 1, wherein the calculated physical properties of the pump pulse include a polarization state of the pump pulse within a particular span of the optical link or within the interaction region.

5. The method as recited in claim 1, further comprising determining a cumulative dispersion within each span along the optical link from the calculated physical properties of the pump pulse.

6. The method as recited in claim 1, wherein the calculated physical properties of the pump pulse include a power of the pump pulse at the first wavelength at the one or more interaction regions.

7. The method as recited in claim 1, wherein generating the first modulated optical carrier comprises modulating an in-service channel at the first wavelength to carry the pump pulses.

8. The method as recited in claim 1, further comprising pre-distorting the pump pulses to have a desired temporal dependence at the one or more interaction regions.

9. The method as recited in claim 1, further comprising repeating the method with the pump pulse in varying polarization states or with the probe pulse in varying polarization states, or with both the pump pulse and the probe pulse in varying polarization states.

10. The method as recited in claim 9, further comprising averaging the measurement on the probe pulse for the varying polarization states to obtain an averaged measurement, wherein calculating physical properties of the pump pulse from the measurement on the probe pulse comprises calculating the physical properties of the pump pulse from the averaged measurement.

11. The method as recited in claim 1, further comprising repeating the method with the probe pulse in varying non-collinear polarization states, and the calculated physical properties of the pump pulse include a polarization state of the pump pulse within a particular span of the optical link.

12. The method as recited in claim 1, further comprising repeating the method with different separations between the first wavelength and the second wavelength and with different interaction regions, and estimating a polarization mode dispersion (PMD) of the optical link from the calculated physical properties of the pump pulse.

13. The method as recited in claim 1, further comprising repeating the method with the pump pulse in varying polarization states, determining a first polarization state that maximizes the common mode phase and a second polarization state that minimizes the common mode phase, and estimating an accumulated polarization dependent loss at the interaction region as the difference between the first polarization state and the second polarization state.

14. A monitoring system for an optical link, the monitoring system comprising:
   a first transmitter to generate a first modulated optical carrier at a first wavelength, the first modulated optical carrier carrying pump pulses;
   a second transmitter to generate a second modulated optical carrier at a second wavelength that differs from the first wavelength, the second modulated optical carrier carrying pilot pulses and carrying probe pulses;
   the first transmitter to transmit the first modulated optical carrier on an optical fiber over the optical link and the second transmitter to transmit the second modulated optical carrier on the optical fiber over the optical link, the optical link comprising multiple spans connected by one or more optical amplifiers, such that a probe pulse of the probe pulses is spatially overlapped in the optical fiber with a pump pulse of the pump pulses within at least one interaction region in the optical link;
   a coherent receiver to perform a measurement on the probe pulse beyond an end of the optical fiber to measure optical properties of the probe pulse relative to a coherent reference, wherein the coherent reference includes a component of at least one of the pilot pulses, the component being coherent to the probe pulse; and a processor to calculate physical properties of the pump pulse from the measurement on the probe pulse, wherein the pilot pulses are arranged to be not spatially overlapped in the optical fiber with any of the pump pulses, or the pilot pulses are arranged so that any interaction between the pilot pulses and any of the pump pulses introduces a negligible error or a deterministic-yet-correctable error in measurement of the optical properties.

15. The monitoring system as recited in claim 14, wherein the calculated physical properties of the pump pulse include a power of the pump pulse at the first wavelength at the one or more interaction regions.

16. The monitoring system as recited in claim 14, wherein the first transmitter is to generate the first modulated optical carrier by modulating an in-service channel at the first wavelength to carry the pump pulses.

17. The monitoring system as recited in claim 14, wherein the first transmitter is a first coherent transmitter, the second transmitter is a second coherent transmitter, and the second coherent transmitter is synchronized to the first coherent transmitter.

18. The monitoring system as recited in claim 14, wherein the coherent reference includes a coherent component of an advance pilot pulse of the pilot pulses in advance of the probe pulse and a coherent component of a following pilot pulse of the pilot pulses following the probe pulse, and wherein the coherent receiver is operative to use the advance pilot pulse and the following pilot pulse to estimate and correct differences between transmit and receive laser sources.

* * * * *

UNITED STATES PATENT AND TRADEMARK OFFICE
CERTIFICATE OF CORRECTION

PATENT NO. : 10,193,620 B2
APPLICATION NO. : 15/953473
DATED : January 29, 2019
INVENTOR(S) : Andrew D. Shiner et al.

Page 1 of 1

It is certified that error appears in the above-identified patent and that said Letters Patent is hereby corrected as shown below:

On the Title Page

In item (73) "Assignee", the state of Ciena Corporation should read "MD"

In the Specification

At Column 6, Line 62, "T" should be replaced with "τ"

At Column 7, Line 9, "T" should be replaced with "τ"

At Column 8, Line 60, "⊇1" should be replaced with "λ1"

At Column 12, Line 53, equation (14) should read:
" $\phi_{XPM}(n+1) - \phi_{XPM}(n) = -\frac{3}{2}\gamma_n L_{eff} P_{max}$  (14) "

At Column 15, Line 5, "\" should be replaced with "†"

At Column 15, Line 10, equation (18) should read:
" $PM^\dagger = U\Sigma V^\dagger$  (18) "

At Column 15, Line 14, "\" should be replaced with "†"

At Column 15, Line 15, equation (19) should read:
"$R = UV^\dagger$  (19)"

At Column 15, Line 31, "p" should be replaced with "$\hat{v}$"

Signed and Sealed this
Ninth Day of April, 2019

Andrei Iancu
*Director of the United States Patent and Trademark Office*